US008269785B2

(12) United States Patent
Kao et al.

(10) Patent No.: US 8,269,785 B2
(45) Date of Patent: Sep. 18, 2012

(54) INTERFACE APPARATUS AND METHOD OF WRITING EXTENDED DISPLAY IDENTIFICATION DATA

(75) Inventors: Ming-Chih Kao, Hsinchu (TW); Chun-Chieh Chen, Hsinchu (TW); Wen-Chin Chen, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 1059 days.

(21) Appl. No.: 11/950,406

(22) Filed: Dec. 4, 2007

(65) Prior Publication Data

US 2009/0027409 A1 Jan. 29, 2009

(30) Foreign Application Priority Data

Jul. 27, 2007 (TW) .............................. 96127471 A

(51) Int. Cl.
*G09G 5/00* (2006.01)
*G09G 5/39* (2006.01)
*G06T 1/60* (2006.01)

(52) U.S. Cl. .......... 345/530; 345/3.1; 345/531; 345/543

(58) Field of Classification Search .................. 345/3.1, 345/530, 531, 543
See application file for complete search history.

(56) References Cited

U.S. PATENT DOCUMENTS

| | | | | |
|---|---|---|---|---|
| 4,811,287 | A * | 3/1989 | Kupersmith et al. | 365/52 |
| 5,465,306 | A * | 11/1995 | Van Lier | 382/276 |
| 5,537,576 | A * | 7/1996 | Perets et al. | 711/150 |
| 5,835,966 | A * | 11/1998 | Ooishi | 711/212 |
| 2004/0027515 | A1* | 2/2004 | Itakura | 349/110 |
| 2007/0057931 | A1* | 3/2007 | Takamori | 345/204 |

FOREIGN PATENT DOCUMENTS

| | | |
|---|---|---|
| CN | 1595353 | 3/2005 |
| CN | 1763705 | 4/2006 |
| JP | 2007206598 | 8/2007 |
| TW | I224731 | 12/2004 |
| TW | 200504600 | 2/2005 |
| TW | 200622627 | 7/2006 |

OTHER PUBLICATIONS

"Office Action of Taiwan Counterpart Application", issued on Mar. 14, 2012, p. 1-p. 7, in which the listed references were cited.

* cited by examiner

*Primary Examiner* — Aaron M Richer
*Assistant Examiner* — Robert Craddock
(74) *Attorney, Agent, or Firm* — Jianq Chyun IP Office

(57) ABSTRACT

An interface apparatus and a method of writing an extended display identification data (EDID) are provided. The interface apparatus includes a data processing unit, a memory unit and a switching unit. The memory unit is coupled to a connector corresponding to the memory unit and the data processing unit via the switching unit. When the interface apparatus is being initialized, the data processing unit detects whether or not the EDID stored in the memory unit is correct. If the EDID stored in the memory unit is incorrect, the data processing unit rewrites the EDID to the memory unit.

17 Claims, 3 Drawing Sheets

INTERFACE APPARATUS AND METHOD OF WRITING EXTENDED DISPLAY IDENTIFICATION DATA

CROSS-REFERENCE TO RELATED APPLICATION

This application claims the priority benefit of Taiwan application serial no. 96127471, filed on Jul. 27, 2007. The entirety of the above-mentioned patent application is hereby incorporated by reference herein and made a part of this specification.

BACKGROUND OF THE INVENTION

1. Field of the Invention

The present invention generally relates to a communication interface, and more particularly, to an interface apparatus for storing an extended display identification data (EDID) and a method of writing the EDID to the interface apparatus.

2. Description of Related Art

In order to support the EDID standard set by the Video Electronics Standard Association (VESA), it is conventional to employ an electrically erasable programmable read only memory (EEPROM) on each input terminal of display systems such as projectors, monitors, or digital televisions for storing an EDID content table of the corresponding input terminal.

An EDID is mainly for storing content related to image resolution and frequency which are supported by display systems. The external input device may identify a suitable and operable resolution and frequency range according to the EDID content. EDID may be found in many related input formats of a projector such as high-definition multimedia interface (HDMI), digital visual interface (DVI), or video graphics array (VGA). During a mass production process, in order to speed up the process, a part of data required by the EDID content table, e.g., production date and serial number of the display system are read from a bar code, and later burnt to the EEPROM together with other content. Different types of display systems correspond to different EDID contents and bar code formats.

Currently, an EDID is often burned individually by an external computer and an external burner to burn the EDID content from the computer to the EEPROM. EDID contents required by a projector is often more than one kind, there often requires considerable labour hours on the operation procedure of burning EDID. Further, after delivered, if the EDID is found destroyed, the maintenance process is very cumbersome as it requires a manual inspection and a rewriting process.

SUMMARY OF THE INVENTION

Accordingly, the present invention is directed to an interface apparatus including a built-in burning circuit in a system for automatically detecting a correctness and integrity of an extended display identification data (EDID) content when initializing the system. If there is any defect, a refresh writing operation is then automatically performed.

The present invention further provides a method of refreshing an EDID. The method includes automatically detecting a correctness of the EDID when initializing a system, and automatically repairing the EDID with a built-in writing function of an electrically erasable programmable read only memory (EEPROM).

An embodiment according to the present invention provides an interface apparatus adapted to a display system. The interface apparatus includes a data processing unit, a first memory unit, a first connector, and a switching unit. The first memory unit is coupled to the data processing unit and the first connector via the switching unit, and is adapted to store a first EDID. When the interface apparatus is being initialized, the data processing unit detects the first EDID stored in the first memory unit via the switching unit and determines the correctness thereof. If the first EDID stored in the first memory unit is incorrect, the first EDID is then rewritten to the first memory unit. If the first EDID stored in the first memory unit is correct, the switching unit then conducts a transmitting path between the first memory unit and the first connector.

According to an embodiment of the present invention, there is provides a method of writing an EDID adapted to an interface apparatus, including the following steps. First, the interface apparatus is switched to an internal reading mode when the interface apparatus is being initialized in which a data processing unit detects whether an EDID thereof is correct or not. If the EDID is incorrect, then the EDID is rewritten, and if the EDID is correct, the interface apparatus is switched to an external reading mode in which an external device is allowed to read the EDID.

The present invention builds in an EDID writing function in the display system, so that the display system need not manually burn EDID contents for different connectors, thus substantially simplifying the production process and reducing the cost. Further, the display system may automatically detect the EDID when initializing the system thereof. If an EDID defect is found, the EDID is then automatically rewritten to the memory, thus reducing problems of display systems caused by damaged EDID.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiments may be utilized and structural changes may be made without departing from the scope of the present invention. Also, it is to be understood that the phraseology and terminology used herein is for the purpose of description and should not be regarded as limiting. The use of "including,""comprising," or "having"

and variations thereof herein is meant to encompass the items listed thereafter and equivalents thereof as well as additional items. Unless limited otherwise, the terms “connected,” “coupled,” and “mounted,” and variations thereof herein are used broadly and encompass direct and indirect connections, couplings, and mountings.

First Embodiment

Figure 1A:
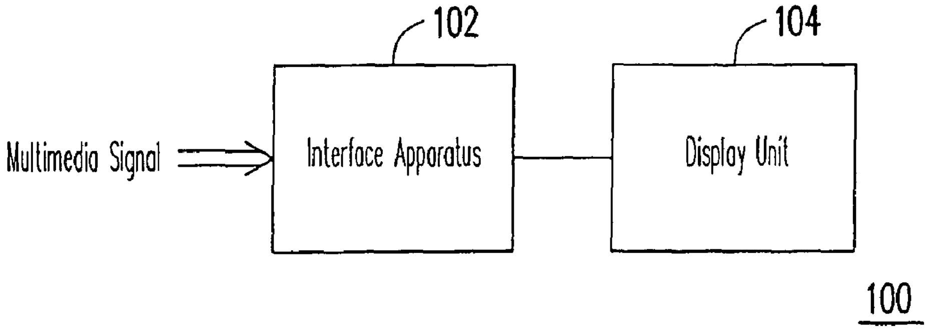
FIG. 1A is a block diagram illustrating a display system according to a first embodiment of the preset invention.

FIG. 1A is a block diagram illustrating a display system according to a first embodiment of the preset invention. Referring to FIG. 1A, a display system 100 includes an interface apparatus 102 and a display unit 104. There is at least one extended display identification data (EDID) stored in the interface apparatus 102. The interface apparatus 102 receives multimedia signals inputted from an external device via a connector. The display unit 104 is adapted to display the received multimedia signals. The display unit 104 for example is a projector, or a liquid crystal display.

When the display system 100 is being initialized, the interface apparatus detects whether or not the EDID is correct. If the detected EDID is incorrect, EDID is then rewritten. Generally, the EDID is stored in an EDID memory, e.g., an electrically erasable programmable read only memory (EEPROM). Therefore the interface apparatus 102 re-burns EDID to a corresponding EDID memory when the interface apparatus detects an incorrect EDID. The interface apparatus 102 also burns corresponding EDID to the EDID memory when initializing the display system 100 if the corresponding EDID is not stored in the EDID memory.

Figure 1B:
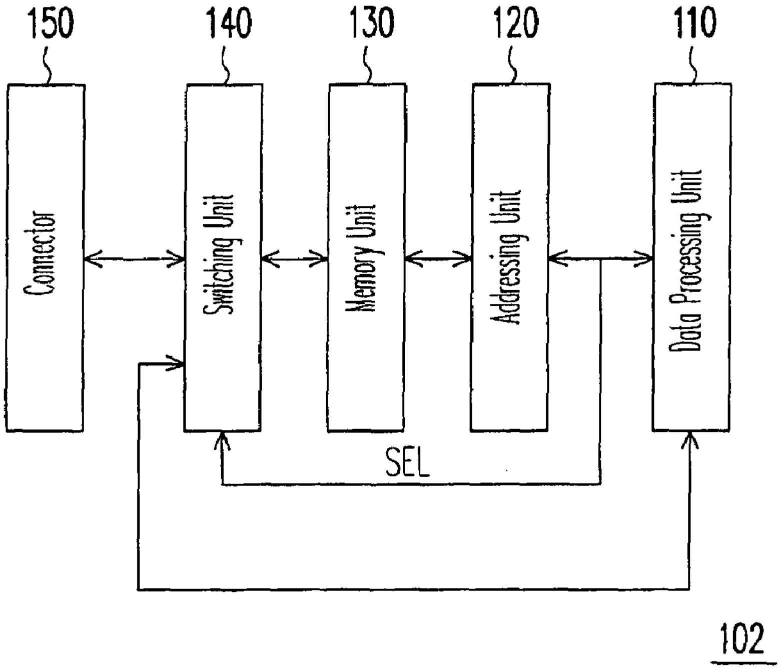
FIG. 1B is a block diagram illustrating an interface apparatus according to the first embodiment of the preset invention.

FIG. 1B is a block diagram illustrating the interface apparatus 102 according to the first embodiment of the preset invention. Referring to FIG. 1B, the interface apparatus 102 includes a data processing unit 110, an addressing unit 120, a memory unit 130, a switching unit 140, and a connector 150. The memory unit 130 is coupled between the switching unit 140 and the addressing unit 120. The switching unit 140 is adapted to switch conducting paths of the data processing unit 110 and the connector 150 to the memory unit 130. The addressing unit 120 is controlled by the data processing unit 110 to define an address of the memory unit 130.

The memory unit 130 stores an EDID corresponding to a type of the connector 150. The EDID may be either an analog EDID or a digital EDID. The connector 150 may be one of a digital visual interface (DVI) connector, a high-definition multimedia interface (HDMI) connector, an M1-DA connector, and a video graphics array (VGA) connector. The memory unit 130 may be an EEFPROM, e.g., HT24LC01/02 manufactured by Holtek Semiconductor Inc.

The switching unit 140, for example, is a multiplexer, e.g., SN74CBT3257 manufactured by TEXAS INSTRUMENTS Inc. The switching unit 140 is controlled by the data processing unit 110. When the system is being initialized, the switching unit 140 switches paths of transmitting data to coupling the data processing unit 110 to an input/output (IO) pin of the memory unit 130 according to a select signal SEL. The data processing unit detects via the switching unit 140 whether or not the EDID stored in the memory unit 130 is correct. If the EDID in the memory unit 130 is incorrect, then the EDID is rewritten. Upon completion of the initialization, the data transmittance path of the memory unit 130 is switched to the connector 150 for regular data transmittance.

The data processing unit 110 is capable of writing the EDID to the memory unit 140, and is adapted to do when detecting an EDID in error, damaged, or lost. The data processing unit 110 is also adapted to refresh the EDID. Therefore, display manufacturers using the present invention need not manually burn the EDID during the manufacturing process. Instead, the related data is stored in the data processing unit 110, and when the interface apparatus is being initialized, the data processing unit automatically writes the EDID. According to an aspect of the embodiment, the data processing unit 110 may be realized by a built-in microprocessor of an ordinary display system, or by an extra microprocessor, e.g., 8051, which is not to be restricted according to the present invention.

The addressing unit 120 is adapted to define an address of the memory unit 130. When the interface apparatus 102 requires only one memory unit 130, it is feasible to fix a voltage level of an address pin of the memory unit 130 can be fixed so as to obtain a fixed address. When the interface apparatus 102 includes a plurality of memory units, the addressing unit 120 determines addresses respectively corresponding to individual memory units according to voltage levels outputted from a general-purpose input/output (GPIO) of the data processing unit 110. For example, when the interface apparatus includes two memory units, an inverter is employed to invert a voltage level of the GPIO into a positive voltage level and a negative voltage level, so as to entitle different addresses to the two memory units. As to those addressed circuits, those of ordinary skill in the art should be well taught in accordance with the teaching of the present invention, and is not to be iterated hereby.

Second Embodiment

Figure 2:
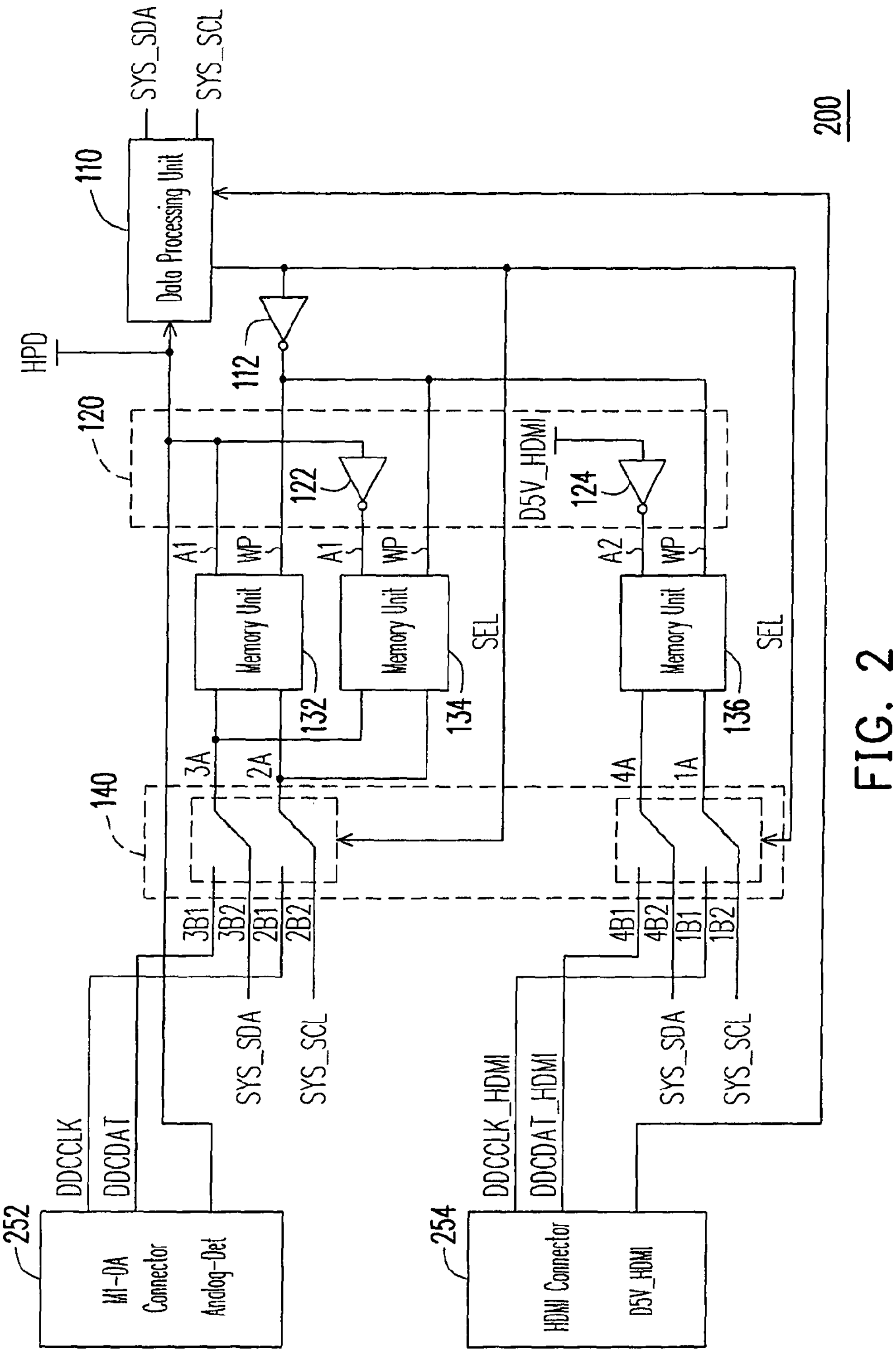
FIG. 2 is a circuit diagram of an interface apparatus according to a second embodiment of the present invention.

FIG. 2 is a circuit diagram of an interface apparatus according to a second embodiment of the present invention. According to the second embodiment, the interface apparatus 200 includes an M1-DA connector 252 and an HDMI connector 254, a switching unit 140, memory units 132, 134 and 136, an addressing unit 120, and a data processing unit 110. The addressing unit 120 is composed of inverters 122 and 124. The M1-DA connector 252 supports DVI signals.

According to an aspect of the present invention, the switching unit 140 is an 8 to 4 multiplexer, in which a pin 1A corresponds to pins 1B1 and 1B2; a pin 2A corresponds to pins 2B1 and 2B2; a pin 3A corresponds to pins 3B1 and 3B2; and a pin 4A corresponds to pins 4B1 and 4B2. According to the second embodiment, all of the memory units 132, 134 and 136 transmit data by an inter-integrated circuit (I2C) bus, and each of the memory units 132, 134 and 136 includes two I/O pins for data transmittance and data burning. The data processing unit 110 communicates with the memory units 132, 134 136 via a clock pin SYS_SCL and a data pin SYS_SDA which are respectively coupled to the pins 1B2, 2B2, and 3B2, 4B2. The M1-DA connector 252 communicates with the memory units 132, 134 via a clock pin DDCCLK and a data pin DDCDAT, which are respectively coupled to the pins 2B1 and 3B1. The HDMI connector 254 communicates with the memory unit 136 via a clock pin DDCCLK_HDMI and a data pin DDCDAT_HDMI, which are respectively coupled to the pins 1B1 and 4B1.

When the select signal SEL is at a logic low level, pins 1A through 4A are conducted respectively to pins 1B1 through 4B1. When the select signal SEL is at a logic high level, pins 1A through 4A are conducted respectively to pins 1B2 through 4B2. The select signal SEL is controlled by the data processing unit 110. When the interface apparatus 200 is being initialized, the select signal SEL is at a logic high level, and when the initialization is completed, the select signal SEL is switched to a logic low level.

In other words, when the interface apparatus 200 is being initialized, the data processing unit 110 utilizes the clock pin SYS_SCL and the data pin SYS_SDA to detect the memory units 132, 134, 136 via the switching unit 140. In the meantime, the switching unit 140 disconnects transmittance paths from the memory units 132, 134 and 136 to the M1-DA connector 252, the HDMI connector 254. When the initialization of the interface apparatus 200 is completed, the switching unit 140 then disconnects transmittance paths from the memory units 132, 134 and 136 to the data processing unit 110, and connects the transmittance paths from the memory units 132, 134 and 136 to the M1-DA connector 252, the HDMI connector 254, so as to allow external devices to transmit data via the M1-DA connector 252, the HDMI connector 254.

Further, each of the memory units 132, 134 and 136 includes a write protection pin WP coupled to the select signal SEL outputted from the data processing unit 110 via the inverter 112. When the select signal SEL is at a logic low level, the memory units 132, 134 and 136 are coupled to the M1-DA connector 252, the HDMI connector 254 via the switching unit 140, during which the write protection pins WP are enabled for preventing the memory units 132, 134 and 136 from being written or being changed about the EDID thereof by external devices. On the contrary, when the select signal SEL is at a logic high level, the memory units 132, 134 and 136 are coupled via the switching unit 140 to the data processing unit 110. The write protection pins WP are disabled at the same time, so at to allow the data processing unit 110 to write the EDID to the memory units 132, 134 and 136. As such, unintended overwriting or damaging the EDID may be effectively avoided when using an external device.

The addressing unit 120 is mainly adapted to define an address of each of the memory units 132, 134 and 136. According to an embodiment of the present invention, each of the memory units 132, 134 and 136 includes a 3-bit address pin. The data processing unit 110 allocates different voltage levels to the address pins A1 of the memory units 132, 134, while other address pins of the memory units 132 and 134 are allocated with low logic levels. Because certain address pins A1 of the memory units 132 and 134 have different voltage levels, the memory units 132 and 134 have different addresses. In the present embodiment, an input terminal of the inverter 122 may also be coupled to a logic high level, e.g., a voltage source of 5 volts, or a hot plug detect (HPD) pin of the M1-DA connector. As such, the memory units 132, 134 may be addressed in accordance with the logic high level of the HPD pin.

The memory unit 136 defines its address pin A2 by a pin D5V-HDMI of the HDMI connector. When the HDMI connector is connected to the external device, the pin D5V-HDMI is at a logic high level, so that the address pin A2 of the memory unit 136 is inverted by an output of the inverter 124 to a logic low level, while other address pins of the memory unit 136 may be coupled to logic low levels. In such a way, the data processing unit 110 may define addresses of the memory units 132, 134, 136 with only one GPIO.

The Hot plug detect (HPD) signal of the M1-DA connector is adapted to provide operation voltage for the memory units 132 and 134, and the HDMI connector 254 provides operation voltages to the memory unit 136 by the voltage source pin, i.e., +5V. In the other hand, the operation voltages of the above components may be provided by the system power. Furthermore, the present invention as embodied above may be directly complied with conventional connection interfaces without interference with the transmittance of the interfaces. Applications and functions of other pins of the HDMI connector 254 and the M1-DA connector 252 may be learnt by referring to manuals thereof, and are not to be iterated hereby.

Third Embodiment

Figure 3:
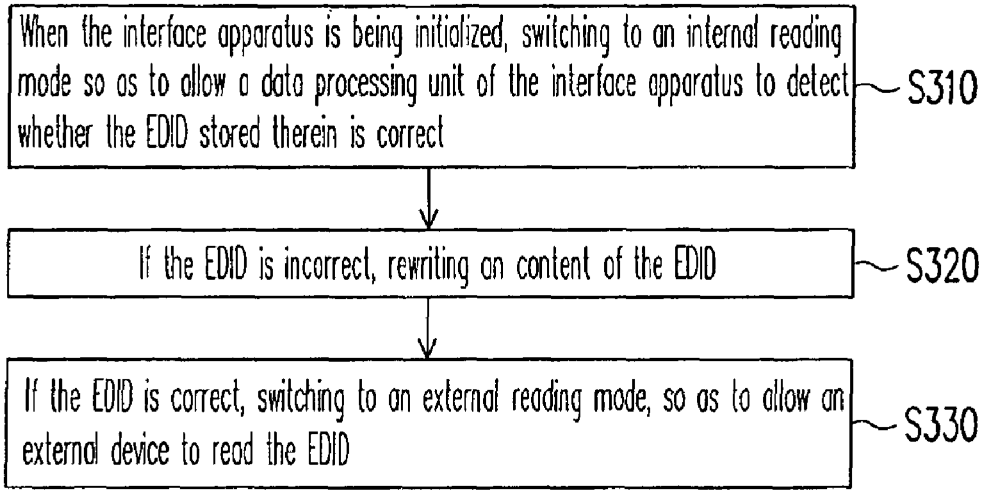
FIG. 3 is a flow chart illustrating a method of writing an EDID according to a third embodiment of the present invention.

According to another aspect of the present invention, a method of writing an EDID adapted to an interface apparatus of a display system is obtained from the foregoing embodiments. With a built-in memory writing function, the display system may automatically write or refresh an EDID as needed, and need not be manually burned. FIG. 3 is a flow chart illustrating a method of writing an EDID according to a third embodiment of the present invention.

Referring to FIG. 3, at step S310, when being initialized, the system is switched to an internal reading mode so as to allow the data processing unit of the interface apparatus to check a correctness of the EDID. Meanwhile, a connection between an external device and the EDID memory is disabled, and an internal system, e.g., a microprocessor of the display detects the EDID in the EDID memory. If the EDID is incorrect, then a content of the EDID is rewritten at step S320. The present invention builds a writing function for the EDID memory in the display. Therefore, when the EDID is detected to be in error or lost, it may be automatically rewritten by the display system. If the EDID is correct, then the system is switched to an external reading mode so as to allow the external device to read the EDID at step S330. At the same time, the connection interface recovers as normal, and the external device may directly read from the EDID memory, but may not write data thereto. A write protection function is still controlled by an internal system for avoiding the EDID from being damaged by the external device.

Corresponding to different types of connectors, the foregoing EDID may be analog EDID or digital EDID. The external device for example may be a computer device, such as a desktop computer or a laptop computer (notebook computer). The internal system for example can be a data processing unit as shown in FIG. 1B.

In summary, the present invention builds in a writing function of EDID in a display system, so as to allow the display system to automatically detect a correctness of the EDID, and automatically write corresponding EDID into an EDID memory when the EDID is detected as in error or lost. As such, labour cost on manually burning EDID can be saved. Also, maintenance problems of damaged EDID caused by inadvertent operation of the display systems are avoided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An interface apparatus, adapted to a display system, comprising:

a data processing unit;

a switching unit; and a plurality of memory units;

wherein a first memory unit of the plurality of the memory units, corresponding to a first connector, is coupled to the data processing unit and the first connector via the switching unit, wherein the first memory unit stores a first extended display identification data, wherein the data processing unit detects via the switching unit, whether or not the first extended display identification data stored in the first memory unit is correct when the interface apparatus is being initialized, and if the first extended display identification data is incorrect, then the first extended display identification data is rewritten into the first memory unit by the data processing unit without sending the first extended display identification data through the first connector.

2. The interface apparatus according to claim 1, wherein if the first extended display identification data stored in the first memory unit is detected to be correct, then the switching unit conducts a transmittance path between the first memory unit and the first connector.

3. The interface apparatus according to claim 1, further comprising:

a second memory unit of the plurality of the memory units, corresponding to a second connector, for storing a second extended display identification data, wherein the second memory is coupled to the data processing unit and the second connector via the switching unit, wherein the data processing unit detects via the switching unit whether or not the second extended display identification data stored in the second memory unit is correct, when the interface apparatus is being initialized and if the second extended display identification data is incorrect, then the second extended display identification data is rewritten into the second memory unit.

4. The interface apparatus according to claim 3, wherein the switching unit is a multiplexer controlled by the data processing unit.

5. The interface apparatus according to claim 3 further comprising:

an addressing unit, coupled to the plurality of memory unit and the second memory unit, and controlled by the data processing unit for respectively defining addresses of the plurality of memory unit and the second memory unit.

6. The interface apparatus according to claim 1, further comprising:

a second memory unit of the plurality of memory units, corresponding to the first connector, for storing a second extended display identification data, wherein the second memory is coupled to the data processing unit and the first connector via the switching unit, the data processing unit detects via the switching unit, whether or not the second extended display identification data stored in the second memory unit is correct when the interface apparatus is being initialized; and if the second extended display identification data is incorrect, then the data processing unit rewrites the second extended display identification data into the second memory unit.

7. The interface apparatus according to claim 6, wherein the first extended display identification data is an analog extended display identification data, and the second extended display identification data is a digital extended display identification data.

8. The interface apparatus according to claim 6, wherein the switching unit is a multiplexer controlled by the data processing unit.

9. The interface apparatus according to claim 6 further comprising:

an addressing unit, coupled to the first memory unit and the second memory unit, and controlled by the data processing unit for respectively defining addresses of the first memory unit and the second memory unit.

10. The interface apparatus according to claim 9, wherein the addressing unit comprises:

an inverter comprising an input terminal coupled to the data processing unit and a first address pin of the first memory unit, and an output terminal coupled to a second address pin of the second memory unit.

11. The interface apparatus according to claim 1, wherein the first memory unit has a write protection function which is controlled by the data processing unit.

12. The interface apparatus according to claim 1, wherein the first extended display identification data is either an analog extended display identification data or a digital extended display identification data.

13. The interface apparatus according to claim 1, wherein first connector is selected from the group consisted of a digital visual interface connector, a high-definition multimedia interface connector, a M1-DA connector, and a video graphics array connector.

14. The interface apparatus according to claim 1, wherein the first memory unit is an electrically erasable programmable read only memory.

15. An method of writing an extended display identification data, adapted to an interface apparatus of a display system, comprising:

switching the interface apparatus to an internal reading mode when the interface apparatus is being initialized so as to allow a data processing unit of the interface apparatus to detect whether the extended display identification data stored in a memory unit is correct;

rewriting a content of the extended display identification data by the data processing unit without using any device externally connected to the interface apparatus when the extended display identification data is incorrect; and switching to an external reading mode when the extended display identification data is correct so as to allow an external device to read the extended display identification data.

16. The method according to claim 15, wherein the extended display identification data comprises an analog extended display identification data and a digital extended display identification data.

17. The method according to claim 15, wherein the external device is a computer device.

* * * * *